G. J. TROSPER.
SOLAR HEATER.
APPLICATION FILED DEC. 19, 1916.
1,325,596.
Patented Dec. 23, 1919.
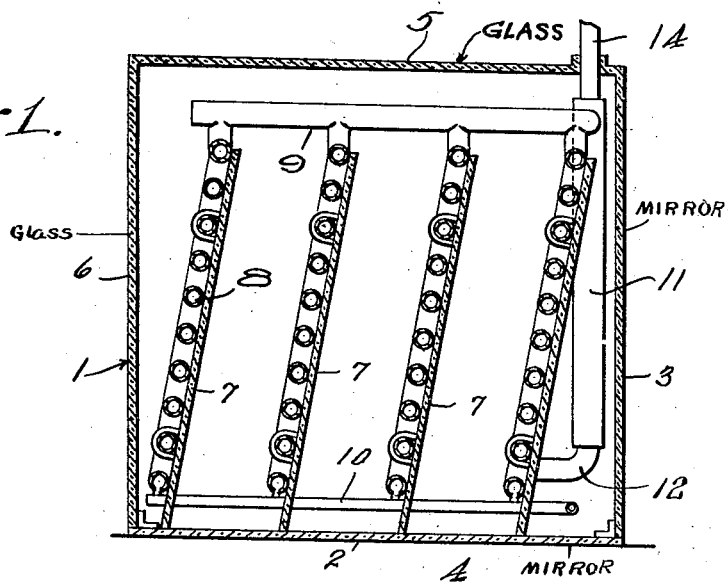
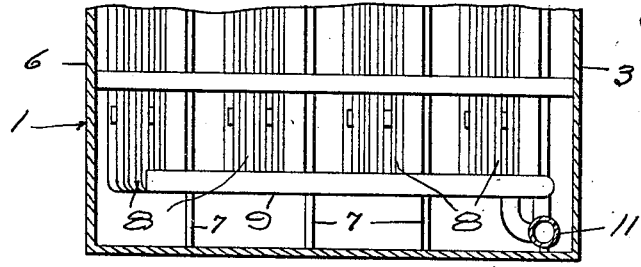

UNITED STATES PATENT OFFICE.

GEORGE J. TROSPER, OF MESA, ARIZONA.

SOLAR HEATER.

1,325,596.                Specification of Letters Patent.    Patented Dec. 23, 1919.

Application filed December 19, 1916. Serial No. 137,806.

*To all whom it may concern:*

Be it known that I, GEORGE J. TROSPER, a citizen of the United States, residing at Mesa, in the county of Maricopa and State of Arizona, have invented certain new and useful Improvements in Solar Heaters; and I do hereby declare the following to be a full, clear, and exact description of the invention, such as will enable others skilled in the art to which it appertains to make and use the same.

This invention relates to new and useful improvements in solar heaters and the principal object of the invention is to provide a device which is adapted to generate a suitable vapor which may be formed at a relatively low temperature and which will expand to operate a steam engine of any preferred type.

A further object of the invention is to provide a solar generator which converts the liquid into a vapor through the action of the sun's rays.

With these and other objects in view the invention consists in the novel combination and arrangement of parts which will be fully set forth in the following specification and accompanying drawings, in which:

Figure 1 is a vertical sectional view through the generator and

Fig. 2 is a horizontal sectional view through the generator.

Referring to the drawings 1 designates as an entirety the generator which as shown in the drawings is of the solar type and comprises a bottom 2 which is preferably formed of glass and provided with a backing to form a mirror. The back wall of the device is designated by the numeral 3 and like the bottom wall 2 is a mirror so that the light rays striking the mirrors will be reflected back and forth on to the coils arranged within the device. The end walls of the generator are designated by the numeral 4 and are formed of clear glass plates as are the top and front walls 5 and 6 respectively. Secured at spaced intervals within the generator 1 are the inclined glass plates 7 which are provided with reflecting surfaces on opposite faces so that the light striking the same will be reflected back and forth. Supported on the plates 7 are suitable coils of pipe 8, the upper ends of which are connected to a steam pipe 9 while the lower ends are connected to a liquid receiving pipe 10 which is connected to the liquid supply. The pipe 9 is connected to a vertical pipe 11, the lower end of which is connected by a pipe 12 to one of the rear coils 8, while the upper end of said pipe 11 is connected to a pipe 14 which conveys the steam to a suitable point.

While in the foregoing there has been shown and described the preferred embodiment of this invention, it is to be understood that such changes may be made in the combination and arrangement of parts as will fall within the spirit and scope of the invention as claimed.

What is claimed is:—

An apparatus of the character described comprising a rectangular casing having its bottom and back walls provided with mirrored inner surfaces and its front, side and top walls of glass, a plurality of parallel inclined supporting plates of glass disposed within the casing, coils mounted on said glass plates, and means connecting said coils.

In testimony whereof I affix my signature in presence of two witnesses.

GEORGE J. TROSPER.

Witnesses:
W. H. KINCADE,
L. TROSPER.